United States Patent Office 3,176,120
Patented Mar. 30, 1965

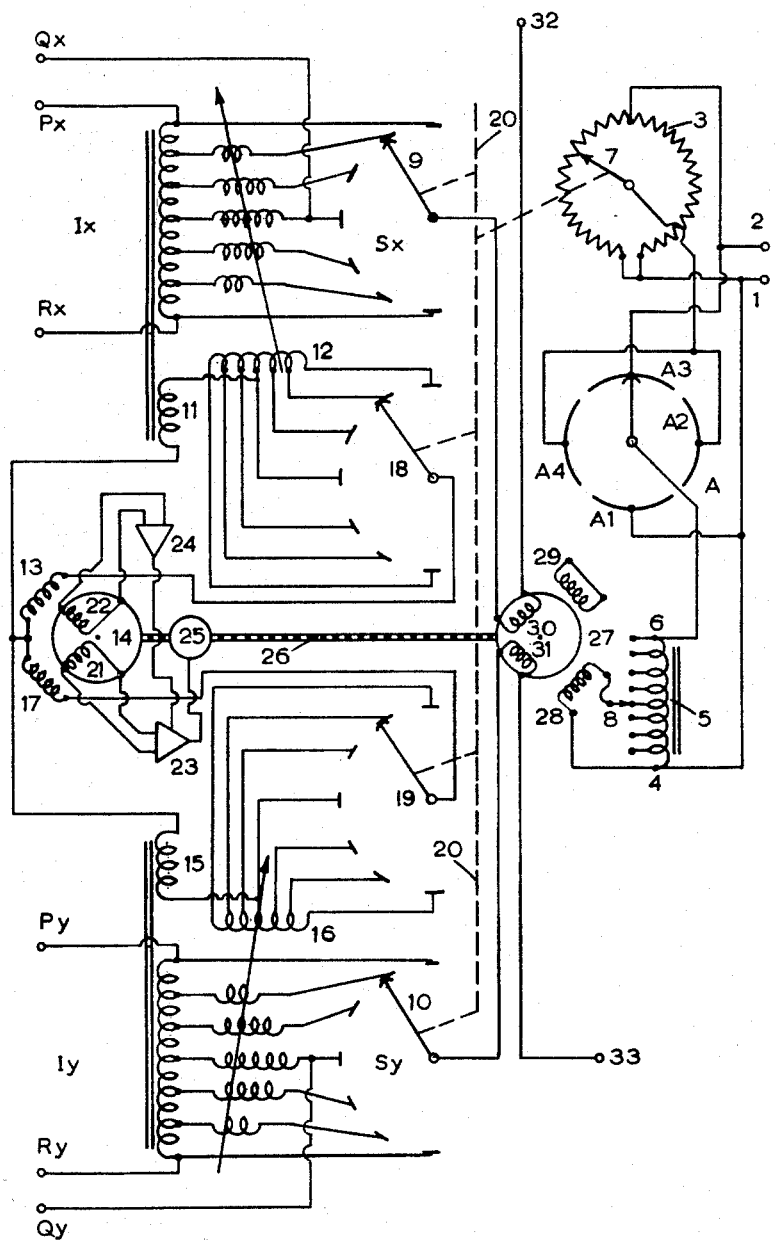

3,176,120
AUTOMATIC CONTROL MECHANISM FOR MACHINE TOOLS
Gerald Whitemore, Hayes, and Donald Ernest Tyzack, Chalfont St. Giles, England, assignors to Electric & Musical Industries Limited, Hayes, England, a company of Great Britain
Filed Feb. 21, 1961, Ser. No. 90,661
Claims priority, application Great Britain, Feb. 25, 1960, 6,559/60
7 Claims. (Cl. 235—151)

This invention relates to automatic control mechanism for machine tools.

It has been proposed to provide control mechanism for machine tools having means whereby the dimensions of a rotary cutter of a machine tool which is being controlled automatically in response to information stored in punched paper tape, for example, are compensated for by the control mechanism, so that the information provided on the punched paper tape may relate to the desired final shape and not to the locus of the cutter centre. This is desirable because it simplifies the preparation of the punched paper tapes.

Alternatively, such means may be applied to compensate only for variations in the dimensions of the cutter from a nominal value, such variations being brought about by wear or a change to a new cutter for example.

Control mechanism according to such a proposal, applicable to two-dimensional control of a cutter, may comprise a shaft which can be positioned at an angle representing the direction of movement of the cutter by means of a servo motor controlled by a resolver responsive to the rates of change of the co-ordinates. This shaft may then drive a second resolver which receives as input signal a representation of the cutter radius or of the deviation of its radius from a nominal value, and which provides as output signals representations of the necessary corrections to the two co-ordinates.

Under certain conditions, such as when the velocity of the cutter along its path is zero, the direction of the cut may be indeterminate and a shaft such as mentioned above may be free to occupy any position, allowing the cutter centre to move to any point on a circle centered on the initial point defined by the stored information. Consequently the cutter may possibly damage the workpiece. In these and other circumstances, it is found necessary to switch out the compensation circuit with the consequent need of switching it in again. If the switching is carried out so that the full compensation is taken in and out instantaneously, the machine tool will be called upon to produce infinite acceleration of the tool relative to the worktable with the possibility of damage to the tool. This is clearly undesirable.

It is the object of the present invention to provide means whereby the above difficulty may be overcome.

According to the present invention there is provided automatic control mechanism for a machine tool comprising means for compensating for the dimensions of a cutter, said means including means whereby the output from said compensating means may be varied gradually between zero and the correct value for compensation.

In order that the invention may be fully understood and readily carried into effect, it will now be described with reference to the single figure of the accompanying drawing which represents in diagrammatic form part of control mechanism for an automatic machine tool according to one example of the invention, said mechanism including means for compensating for the dimensions of the cutter.

In the case of a two dimensional control system using cartesian co-ordinates in which it is desired to compensate for a cylindrical cutter of radius $r$, it may easily be seen that the corrections required are $$-r \sin\left[\tan^{-1}\left(\frac{dy}{dT}\bigg/\frac{dx}{dT}\right)\right] \text{ and } r \cos\left[\tan^{-1}\left(\frac{dy}{dT}\bigg/\frac{dx}{dT}\right)\right]$$

in the $x$ and $y$ directions, respectively, where T is a common parameter.

Referring to the drawing, a reference source of alternating voltage is connected to the terminals 1 and 2. The terminal 1 is connected to the end terminals of a potentiometer 3, to contact A1 of the switch A and to terminal 4 of the transformer winding 5. The terminal 2 is connected to the centre tap of the potentiometer 3 and to contact A3 of the switch A. The wiper 7 of the potentiometer 3 is connected to contacts A2 and A4 of the switch A, of which the wiper is connected to the terminal 6 of the transformer winding 5.

The winding 5 is tapped at a number of points, a selected one of which the wiper 8 contacts.

Two quadratic interpolators I$x$ and I$y$ of the type described in United State patent specification No. 2,928,-604 receive applied alternating voltages representing the values of $x$ and $y$ co-ordinates respectively of three points P, Q and R, at the terminals P$x$, Q$x$ and R$x$, and P$y$, Q$y$ and R$y$. Each interpolator comprises two transformers, one of which is an auto transformer having a number of equally spaced taps to the end terminals of which the alternating voltage representing the respective co-ordinate values of points P and R are applied. The second transformer has a number of quadratically related windings, which are connected between the output connections of the interpolator and the taps on the auto-transformer. The output connections of the interpolators are studs of a selector. The alternating voltages representing the co-ordinate values of the point Q are applied to the one of the output connections which is connected via one of the windings on the second transformer to the central tap on the auto-transformer of the respective interpolartor.

The output signals of the interpolators which represent co-ordinate values of points between PQ and R in a parabola through PQ and R are selectors S$x$ and S$y$ associated with the interpolators I$x$ and I$y$ respectively.

The windings 11 and 12 are coupled to the auto-transformer and the second transformer of the interpolator I$x$, in the manner described in the specification of co-pending United States patent application No. 849,091, now Patent Number 3,100,975, so that the voltage applied across the stator winding 13 of the receiver 14 represents $$\frac{dx}{dT}$$

for the parabola PQR where T is the interpolation variable.

In a similar way, the windings 15 and 16 are coupled to the auto-transformer and second transformer respectively of the interpolator I$y$, so that the voltage applied across the stator winding 17 of the resolver 12 represents $$\frac{dy}{dT}$$

As stated above, T is the parameter in respect of which interpolation is performed by the interpolators.

The windings 12 and 16 are tapped and the taps are connected to the contacts of selectors 18 and 19, respectively, the wipers of which are ganged with the wipers 9 and 10 of the selectors S$x$ and S$y$ by means of a shaft indicated by the dotted line 20. The position of this shaft represents the parameter T.

The resolver 14 has two rotor windings 21 and 22 connected to the input connections of amplifiers 23 and 24 respectively. The output of amplifier 24 is connected to a gain control connection of amplifier 23 in the manner described in United States Patent Number 2,900,590 so that the sensitivity of the servo mechanism comprised by the winding 21, the amplifier 23 and the motor 25 which is controlled by the output of amplifier 23 and coupled via the shaft 26 to the rotor of resolver 14, is maintained at a substantially constant value.

The rotor of a second resolver 27 is attached to the shaft 26 so that it rotates with the rotor of the resolver 14. A stator winding 28 of the resolver 27 is connected between the point 4 and the wiper 8. The stator winding 29 of the resolver 27 is short circuited. From across the rotor winding 30 and 31 of the resolver 27 are obtained the output voltages which represent the compensations required in the $x$ and $y$ co-ordinate directions respectively for the dimensions of the cutter. The winding 30 is connected between the wiper 9 and the output terminal 32. The winding 31 is connected between the wiper 10 and the output terminal 33.

The signal at the output terminal 32 therefore represents the $x$ co-ordinate value of a point on the parabola PQR, compensated for the size of the cutter, and is used to operate a positional servo mechanism which controls the relative displacement between the cutter and the workpiece of a machine tool in the $x$ direction. Similarly, the signal at the output terminal 33 represents the $y$ co-ordinate value of the same point on the parabola compensated for the size of the cutter, and is used to operate a second positional servo mechanism which controls the relative displacement between the cutter and the workpiece of a machine tool in the $v$ direction.

If $\theta$ is the angular position of the shaft 26, then the voltage induced in the winding 21 as a result of the voltages across windings 13 and 17 is $$\frac{dx}{dT} \sin \theta - \frac{dy}{dT} \cos \theta$$

if the zero for $\theta$ is chosen correctly. By virtue of servo action of the amplifier 23 and the motor 25 the shaft 26 will be rotated until $$\frac{dx}{dT} \sin \theta - \frac{dy}{dT} \cos \theta = 0$$

that is until $$\theta = \tan^{-1}\left(\frac{dy}{dT} \bigg/ \frac{dx}{dT}\right)$$

If the voltage across the winding 28 represents $r$, the radius of the cutter and the rotor of resolver 27 is correctly positioned on the shaft 26, then the voltage induced in the winding 30 and added to the $x$ co-ordinate value signal at the wiper 9 is representative of:

$$-r \sin\left[\tan^{-1}\left(\frac{dy}{dT} \bigg/ \frac{dx}{dT}\right)\right]$$

and that in the winding 31 and added to the $y$ co-ordinate value signal at the wiper 10 is:

$$r \cos\left[\tan^{-1}\left(\frac{dy}{dT} \bigg/ \frac{dx}{dT}\right)\right]$$

Clearly then the voltages across the windings 30 and 31 may be injected into the $x$ and $y$ co-ordinate servo loops of the positioning equipment to provide compensation for an amount $r$ in the radius of a cutter.

The radius for which compensation is required is set up by the wiper 8 on the winding 5, so that if the full voltage of the reference supply is applied across the points 4 and 6, a voltage representing the radius is supplied to the winding 28. The wiper may be operated by a uniselector or built up from relays and operated in response to a signal derived from the programme record for the machine tool or manually operated.

During a cutting operation in which the cutter radius or wear compensation is not required the wiper of the switch A is connected to the contact A1 so that no voltage is applied across the winding 5 and consequently no voltage appears across the winding 28.

At the start of a cutting operation in which it is desired not to compensate for the cutter dimensions initially but to bring in the compensation during the first span say PQR of the cut, the wiper of the switch A is connected to contact A2. The wiper of the potentiometer 3 is coupled to the shaft indicated by the dotted line 20 which drives the switches for the interpolator used in positioning the worktable so that as the interpolators progress from the initial reference point P via the second reference point Q to the third R, thus describing the first span of the cut, the wiper of the potentiometer 3 moves from the lower part of the potentiometer where it is connected to the terminal 1 in a clockwise direction, via the upper part of the potentiometer where it is connected to the terminal 2 to the lower part of the potentiometer again. Thus the voltage applied between points 4 and 6 increases gradually during the first half of the span, that is P to Q, from zero to the full voltage of the reference supply, and decreases to zero again during the second half of the span, Q to R.

The coupling of the potentiometer 3 to the interpolator drive shaft may be a fixed gearing so that the wiper of the potentiometer 3 moves from the left hand end to the centre of the potentiometer during the first halves of spans and from the centre to the right-hand and during the second halves of spans, in which case the potentiometer 3 may have a closed circular resistance track with two connections thereto at diametrically opposite points or a make-before-break contact arranged between the ends of the potentiometer.

At the end of the half span in which the cutter radius compensation is brought in the wiper of switch A moves to contact A3, thus maintaining the application of the full reference voltage to the ends of transformer 5. The switch A is of the make-before-break type. The switch A may be selectively driven by a cam on the interpolator drive shaft so that the movement of the wiper occurs at the transition between the appropriate half spans.

When it is desired to remove the cutter radius compensation from the system, which may be performed only on second halves of spans, the wiper of switch A is moved from A3 to A4 at the transition to the half span in which the removal is to be carried out in response to a coded signal on the instruction tape at which time the wiper of potentiometer 3 will be effectively connected to the terminal 2 via contact A3. During the selected half span, the wiper of the potentiometer 3, which is driven continuously by the interpolator drive motor, so as to perform a revolution during a span, will move towards the right-hand end of the track, gradually reducing the compensation signal and becoming zero when the wiper has reached the right-hand end of the track, at the end of the half span. The wiper of switch A moves to A1 at the end of the half span and maintains zero input to the transformer 5 and thereby zero compensation. The movement of the switch A may be performed by a uniselector in response to signals coded on the punched paper tape or other programme record on which the instructions are recorded.

It will be appreciated that the interpolation system shown is very rudimentary and in practice two interpolators would be used for each co-ordinate, so that stores for the co-ordinate values of reference points may be set up for one interpolator while the other is being used to supply the positioning signal to the servo. Furthermore, subinterpolating means may be included in the connections between the wipers 9 and 10 and the terminals 32 and 33.

Many variants are possible within the scope of the invention which will be clearly obvious to those skilled in the art, for example, the switch A and the potentiometer 3 may be sited in the leads to the winding 28.

Although the invention has been described with reference to a cutter dimension compensation arrangement for a cutter of circular cross section in a two dimensional cartesian system, it may readily be applied to a compensation arrangement for any shape of cutter, in other than cartesian systems, or systems involving more than two dimensions. The invention may also be applied to a machine tool using a flame cutter.

What we claim is:

1. Automatic control apparatus suitable for controlling the relative displacement of a cutter and a workpiece according to a desired outline comprising a source of a signal which varies to represent the value of a first co-ordinate associated with the corresponding value of a second co-ordinate to define said outline, means for resolving a further signal representing a dimension of said cutter acting in the instantaneous direction of the normal to said outline into component signals in the directions of said co-ordinates, deriving means responsive to the signal from said source and the component signals from said resolving means for deriving signals for controlling the relative displacement of said cutter and said workpiece taking account of said cutter dimension, said resolving means including means for selectively variably adjusting said component signals controlled by said deriving means whereby the compensation for said cutter dimension can be varied between zero and the correct value during description of an initial portion of said outline.

2. Automatic control apparatus suitable for controlling the relative displacement of a cutter and a workpiece according to a desired outline comprising a source of a signal which varies to represent the value of a first co-ordinate associated with the corresponding value of a second co-ordinate to define said outline, means responsive to said signal and the value of said second co-ordinate for resolving a further signal acting in the instantaneous direction of the normal to said outline into component signals in the directions of said co-ordinates, deriving means responsive to the signal from said source and the component signals from said resolving means for deriving signals for controlling the relative displacement of said cutter and workpiece taking account of said further signal, said resolving means including means controlled by said deriving means for selectively variably adjusting said further signal from zero to the correct value for compensating for the size of said cutter during the description of an initial portion of said outline.

3. Automatic control apparatus suitable for controlling the relative displacement of a cutter and a workpiece according to a desired outline comprising a source of signals which vary to represent corresponding values of first and second co-ordinates to define said outline, means for resolving a further signal acting in the instantaneous direction of the normal to said outline into component signals in the directions of said co-ordinates, deriving means responsive to signals from said source and to component signals from said resolving means for deriving signals for controlling the relative displacement of said cutter and workpiece taking account of said further signal, said resolving means including means controlled by said deriving means for selectively variably adjusting said further signal from zero to the correct value for compensation for the size of said cutter during the description of an initial portion of said outline.

4. Automatic control apparatus suitable for controlling the relative displacement of a rotary cutter and a workpiece according to a desired outline comprising a source of command signals which vary to represent the values of first and second co-ordinates defining said outline, means for producing an indication of the rate of change of said first co-ordinate with respect to said second co-ordinate, means for deriving signals from said source for controlling the relative displacement of said cutter and workpiece, means responsive to the operation of said deriving means for generating a further signal which increases gradually from zero to a value representing the radius of said cutter in the plane of said co-ordinates during the description of an initial portion of said outline, a first resolver responsive to said indication for resolving said further signals from the normal to said outline into signals representing the components lying in the directions of said first and second co-ordinates and means for adding said component signals to the command signals for the respective co-ordinates.

5. An automatic control mechanism according to claim 4, wherein the means for generating a further signal comprises a source of a signal representing the radius of said cutter and a potentiometer included in a connection between said source of a radius signal and said resolver.

6. An automatic control mechanism according to claim 4, wherein said means for producing an indication of the rate of change of said first co-ordinate with respect to said second co-ordinate comprises means responsive to said command signals to produce signals representative of the rates of change of said co-ordinates with respect to a common parameter, a second resolver, means for applying said signals representative of the rates of change to the stator windings of said second resolver, and a servo motor coupled to the rotor of said second resolver, and responsive to the signal derived from a rotor winding of said second resolver to tend to reduce said derived signal to zero, whereby the position of the rotor of said second resolver provides said indication.

7. An automatic control mechanism according to claim 6 wherein the means for generating a further signal comprises a potentiometer included in a connection between a reference source and said first resolver and said potentiometer is adjusted in response to said common parameter whereby said component signals are varied between zero and the correct value for compensation of the radius of the cutter while the cutter describes the outline relative to the worktable.

References Cited by the Examiner
UNITED STATES PATENTS

| 2,660,700 | 11/53 | Gates | 235—184 XR |
| 2,843,811 | 7/58 | Tripp | 235—151 XR |
| 3,073,998 | 1/63 | Bower | 318—162 |

MALCOLM A. MORRISON, *Primary Examiner.*
WALTER W. BURNS, *Examiner.*

FO-1050
(5/69)

UNITED STATES PATENT OFFICE
CERTIFICATE OF CORRECTION

Patent No. 3,176,120                  Dated March 30, 1965

Inventor(s) GERALD WHITEMORE and DONALD ERNEST TYZACK

It is certified that error appears in the above-identified patent and that said Letters Patent are hereby corrected as shown below:

Column 2, line 46, "849,091" should read "627,614";
line 47, "3,100,975" should read "3,009,642".

SIGNED AND
SEALED

SEP 9 - 1969

(SEAL)
Attest:

Edward M. Fletcher, Jr.
Attesting Officer

WILLIAM E. SCHUYLER, JR.
Commissioner of Patents